March 6, 1934. F. H. OWENS 1,950,092
OPTICAL PRINTING APPARATUS
Original Filed July 9, 1930  2 Sheets-Sheet 2
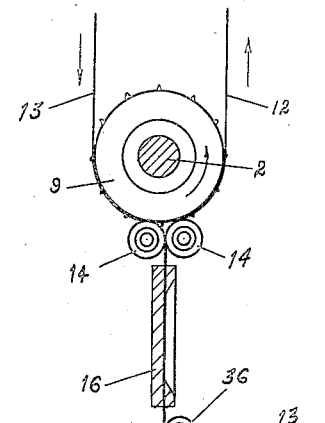
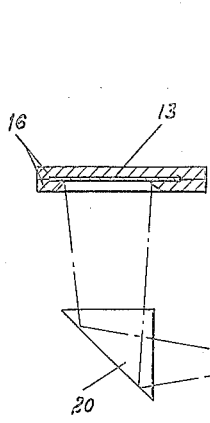
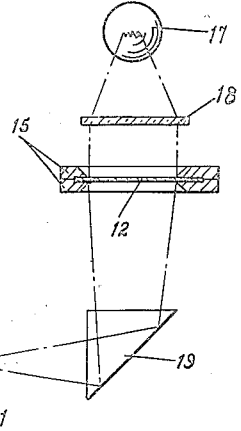
Fig.3.
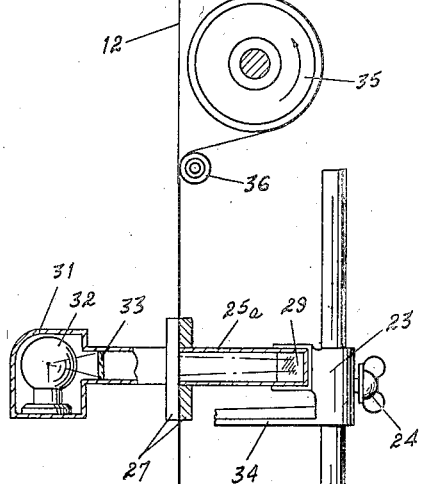
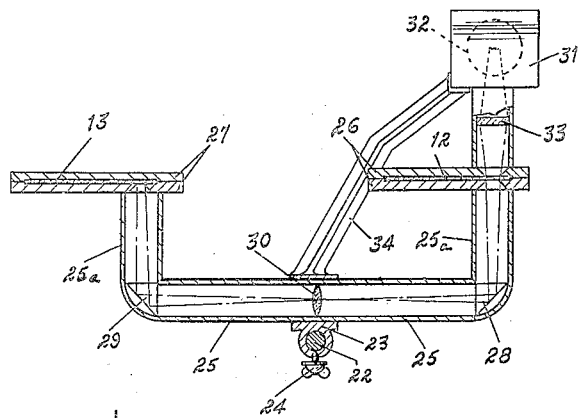
Fig.4.
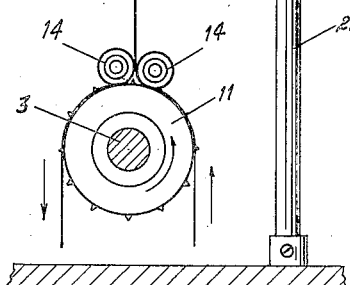
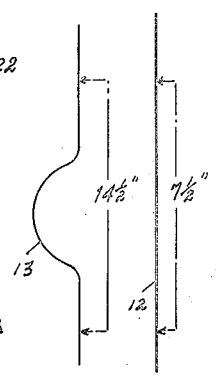
Fig.2.  Fig.5.
INVENTOR.
FREEMAN H. OWENS.
BY
ATTORNEY.

Patented Mar. 6, 1934

1,950,092

UNITED STATES PATENT OFFICE 1,950,092

OPTICAL PRINTING APPARATUS

Freeman H. Owens, New York, N. Y., assignor to Owens Development Corporation, New York, N. Y., a corporation of New York Application July 9, 1930, Serial No. 466,725
Renewed August 2, 1933

7 Claims. (Cl. 88—24)

This invention relates to improvements in optical printing apparatus, the principal object of the invention being to provide a device of this character which is particularly adapted for printing on a positive film during a single run of said film through the apparatus, the picture images and an appropriate sound record from a negative film carrying said images and record.

A further object of the invention is to provide, in an apparatus of the character set forth, means for lengthening the path of travel of the positive film as compared with that of the negative film between the printing stations for the picture images and sound records respectively.

Ordinarily, when a negative film bearing picture images is exposed in a sound camera for the purpose of making a record on said film of sounds appropriate to the picture, the beginning of the sound record is spaced approximately seven and a half inches from the beginning of the corresponding picture images. However, when the positive film bearing both the picture images and sound record is run through a projector for reproduction, the sound record must be spaced approximately fourteen and a half inches from the corresponding picture images. The present invention, therefore, contemplates the provision of means for compensating for this difference between the relative positions of the picture images and sound record on the negative film and the desired relative positions on the positive film.

Other objects and advantages of the invention will appear as the description proceeds.

In the drawings accompanying this specification,

Figure 2 is a diagrammatic, partly sectional side view of the apparatus shown in Figure 1;

Figure 3 is a diagrammatic plan view of the picture printing unit of the apparatus.

Figure 4 is a sectional plan view of the sound printing unit; and

Figure 5 is a diagrammatic view illustrating the method of compensating for the difference in the lengths of the respective paths through which the positive and negative films are caused to travel between the picture printing station and the sound record printing station.

Figure 1:
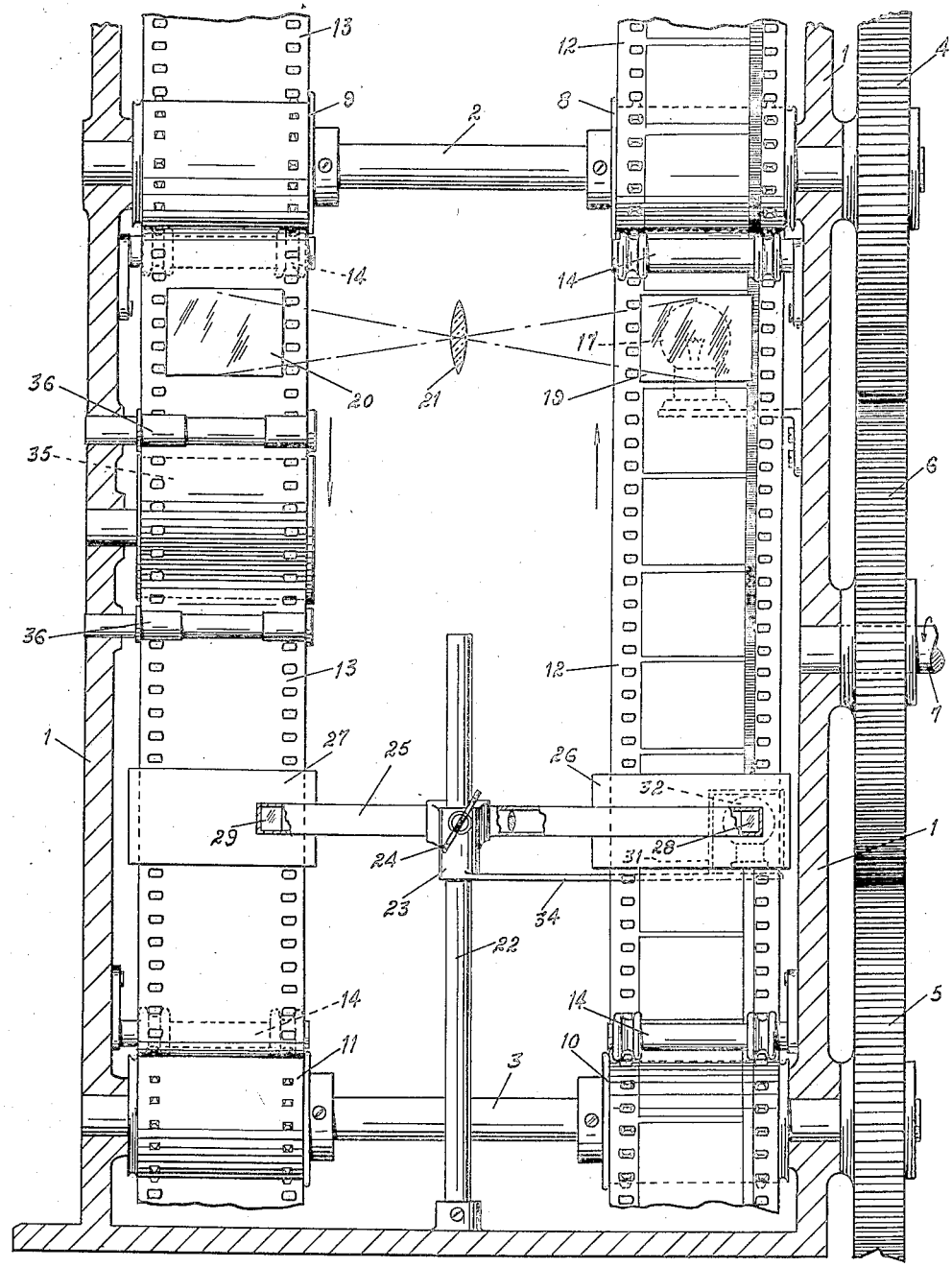
Figure 1 is a sectional front view of an apparatus embodying the features of the present invention, with parts broken away.

Referring to the drawings, 1 designates a frame or housing, in which a pair of shafts 2 and 3 are mounted for rotation at points respectively near the upper and lower ends of the housing, each of said shafts having secured thereon outside of the housing a gear, 4 and 5 respectively, said gears being in mesh with a gear 6 secured to a driving shaft 7 which has a bearing in the wall of the housing at a point intermediate the shafts 2 and 3. Motion in the same direction will thus be imparted by the shaft 7 to the shafts 2 and 3. The shaft 2 has secured thereto near its opposite ends a pair of sprockets 8 and 9, while the shaft 3 has secured thereto a pair of sprockets 10 and 11 in vertical alignment respectively with said sprockets 8 and 9. The sprockets 8 and 10 are adapted to engage a negative film 12 and cause the same to travel through the apparatus, and the sprockets 9 and 11 to engage a positive film 13 for the same purpose. As indicated in Figures 1 and 2, however, the films 12 and 13 engage their respective sprockets at diametrically opposite sides of the sprockets so that the films will travel in opposite directions. Associated with each of the sprockets is a film retaining roller 14 of the usual construction, which, under tension of a spring, not shown, retains the film in engagement with its sprockets.

Supported in the housing at points immediately below the sprockets 8 and 9 respectively are a pair of film gates 15 and 16, through which the respective films 12 and 13 are led in their passage from one sprocket to another. The gate 16 forms the printing station for the picture images, while the gate 15, through which the negative film passes, provides an exposure point at which light from a printing lamp 17 passes through the picture portion of said film, a suitable diffusing screen or glass 18 being disposed between the lamp and said gate 15. In alignment with the gate 15 and lamp 17 is mounted a prism 19 of such form and so disposed as to deflect the illuminated image which it receives from the lamp into a path generally at right angles to the path of the image between the negative film and said prism 19. In alignment with the gate 16 is mounted a second prism 20 directly opposite the prism 19 and so formed and disposed as to receive the image from said prism 19 and again deflect it into a path at right angles to the path of reception, whereby said image will be impressed upon the positive film as it passes the printing station in the gate 16. Between the prisms 19 and 20 is mounted a suitable lens 21 for focusing the image from the prism 19 on to the prism 20.

The sound record printing unit is preferably mounted on a standard 22 secured at its lower end to the base of the housing 1. The unit is carried by a sleeve 23 mounted for sliding movement on the standard and provided with a clamping screw 24 for securing it at any desired height on the standard. Attached to the sleeve 23 is a U-shaped tube or housing 25, which carries at its opposite ends a pair of film gates 26 and 27 disposed off center with relation to the legs 25a of said tubular housing whereby said legs will be centered on the sound record portions of the films 12 and 13 as they pass through the respective gates 26 and 27. Within the housing 25, at each of the angles formed by the intersection of the housing and its legs is mounted a prism, 28 and 29 respectively, both of said prisms being of such form and so disposed that light received by them will be deflected to a path at right angles to the path of reception. Mounted within the housing 25 is a suitable lens 30 for focusing light from the prism 28 on the prism 29. That leg of the housing which carries the gate 26 extends beyond said gate into communication with a lamp housing 31 within which is mounted a printing lamp 32, a diffusing screen or glass 33 being disposed in the end of the tube between said lamp and the gate 26. For providing adequate support for the lamp and its housing, a bracket or arm 34 extends out from the sleeve 23 to a point below the lamp housing.

Means is provided herein for compensating for the different relative positions of the picture images and sound record on the negative and positive films respectively. This means comprises an idler roller 35 disposed in the path of the positive film during its passage from the picture printing gate 16 to the sound record printing gate 27, the film being caused to pass out of its straight course and over said roller 35, as shown most clearly in Figure 2, a pair of guide rollers 36 being provided for maintaining the film in proper position before and after its passage over the roller 35. The diameter of this roller is such as to carry the film off its course sufficiently to take up the difference between the relative positions of the picture and sound records on the negative film and the desired relative positions on the positive film, as hereinbefore explained.

The operation of the apparatus is as follows: A negative film carrying the usual frames of picture images and an appropriate sound record disposed in parallel relation with the picture images, is threaded upward over the sprocket 10, through the gates 26 and 15 and over the sprocket 8, while a sensitized film is threaded downward over the sprocket 9, through the gate 16, over the roller 35, through gate 27 and over sprocket 11. The driving shaft 7 is then caused to rotate so as to impart motion to the sprockets 8, 9, 10 and 11, and owing to the fact that the films engage their respective sprockets at diametrically opposite points the films will be caused to travel in opposite directions, as hereinbefore stated. As soon as the films have arrived at their proper relative positions, the printing lamps are set into operation, whereupon the picture images will be transferred to the positive film at the printing gate 16, while the sound record will be transferred to said film at the printing gate 27, and by reason of the provision of the roller 35 the path of the positive film is lengthened between the printing stations so that the picture images and the sound record on said positive film will occupy the proper relative positions for reproduction by the usual projector.

I claim:

1. An optical printing apparatus, comprising in combination, a housing, a pair of shafts mounted for rotation in parallel relation in said housing, means for rotating said shafts in the same direction, means carried by said shafts for engaging a picture and sound record film and a sensitized film and moving said films in opposite directions, a picture projecting station and a sound record projecting station in the path of said first named film, a picture printing station and sound record printing station in the path of said sensitized film, means for directing light from said projecting stations to said printing stations respectively, and fixed means between said printing stations for guiding the sensitized film out of its normal path thereby to increase the length of said film relatively to that of the first named film between its stations.

2. An optical printing apparatus, comprising in combination, a housing, a pair of shafts mounted for rotation in parallel relation in said housing, means for rotating said shafts in the same direction, means carried by said shafts for engaging a picture and sound record film and a sensitized film and moving said films in opposite directions, a picture projecting station and a sound record projecting station in the path of said first named film, a picture printing station and a sound record printing station in the path of said sensitized film, said sound record projecting and printing stations being adjustable relative to said picture projecting and printing stations, means for directing light from said projecting stations to said printing stations respectively, and means between said printing stations for guiding the sensitized film out of its normal path thereby to increase the length of said film relatively to that of the first named film between its stations.

3. An optical printing apparatus, comprising in combination, a pair of projecting stations disposed in vertical alignment and a pair of printing stations disposed in vertical alignment with each other and horizontally parallel with said projecting stations respectively, means for moving a picture and sound record film past said projecting stations, means for moving a sensitized film past said printing stations, means for projecting light through the picture image portion of the first named as it passes one of said projecting stations and through the sound record portion as it passes the other projecting station, and means between said projecting stations and printing stations for receiving the projected light and deflecting the same to the respective printing stations.

4. An optical printing apparatus, comprising in combination a pair of projecting stations disposed in vertical alignment and a pair of printing stations disposed in vertical alignment with each other and horizontally parallel with said projecting stations respectively, means for moving a film carrying picture images and a sound record past said projecting stations, means for moving a sensitized film past said printing stations, means for projecting light through the picture image portion of the first named film as it passes one of said projecting stations and through the sound record portion as it passes the other projecting station, means between said projecting stations and printing stations for receiving the projected light and deflecting the same to the respective printing stations thereby to impress said light on said sensitized film, and means for increasing the length of the sensitized film between the printing stations relatively to the length of the first named film between its projecting stations.

5. An optical printing apparatus, comprising in combination, a housing, a pair of shafts mounted for rotation in parallel relation in said housing, means for rotating said shafts in the same direction, a pair of sprockets carried by each of said shafts, one sprocket of each pair being adapted to engaging a picture and sound record film and the other sprocket of each pair adapted to engage a sensitized film at a point on said sprockets diametrically opposite from the first named film thereby to move said films in opposite directions, a picture projecting station and a sound record projecting station in the path of said first named film, a picture printing station, and a sound record printing station in the path of said sensitized film, means for directing light from said projecting stations to said printing stations respectively, and means between said printing stations for guiding the sensitized film out of its normal path thereby to increase the length of said film relatively to that of the first named film between its stations.

6. An optical printing apparatus, comprising in combination, a housing, a pair of shafts mounted for rotation in parallel relation in said housing, means for rotating said shafts in the same direction, means carried by said shafts for engaging a picture and sound record film and a sensitized film and moving said films in opposite directions, a picture projecting station and a sound record projecting station in the path of said first named film, a picture printing station and a sound record printing station in the path of said sensitized film, means for directing light from said projecting stations to said printing stations respectively, and a guide roller disposed between said printing stations, said sensitized film being adapted to pass over said roller during the passage of the film from one printing station to the other thereby to increase the length of said film relatively to that of the first named film between its stations.

7. In an optical printing apparatus, a printing unit comprising a standard, a tubular housing mounted for vertical adjustment on said standard and having a main portion and a pair of end portions extending at an angle from said main portion, a film gate carried by each of said end portions, means for supplying light to one of said gates, and deflecting members disposed in said housing at the intersections of the main portion with said end portions thereby to transmit light from one film gate to the other.

FREEMAN H. OWENS.